United States Patent [19]
Steele

[11] 3,734,674
[45] May 22, 1973

[54] IMPLEMENT FOR FORMING PIE CRUST

[76] Inventor: Doty M. Steele, 1615 N. Edgemont St., Los Angeles, Calif. 90027

[22] Filed: Aug. 2, 1971

[21] Appl. No.: 168,065

[52] U.S. Cl. ............................................. 425/458
[51] Int. Cl. .............................................. A47j 43/00
[58] Field of Search ...................... 425/458, 218, 87; 15/235.8, 236; 401/9, 10; 118/18

[56] References Cited

UNITED STATES PATENTS

| 2,247,604 | 7/1941 | Christman | 425/458 |
| 2,586,372 | 2/1952 | Palenchar | 425/458 X |
| 2,902,713 | 9/1959 | Buelow | 425/458 X |
| 2,818,602 | 1/1958 | Haretik et al. | 425/458 X |

Primary Examiner—J. Spencer Overholser
Assistant Examiner—David S. Safran
Attorney—Forrest J. Lilly

[57] ABSTRACT

The disclosure is of a tamper implement, comprising a block contoured for use in moving and tamping cracker crumbs into position within a pie pan to form a cracker crumb pie crust.

3 Claims, 6 Drawing Figures

PATENTED MAY 22 1973 3,734,674

INVENTOR.
DOTY M. STEELE
BY Forrest J. Lilly
ATTORNEY

IMPLEMENT FOR FORMING PIE CRUST

FIELD OF THE INVENTION

This invention relates generally to an implement for the convenient, rapid, and relatively precise forming of a pie crust, using, usually, graham cracker crumbs.

BACKGROUND OF THE INVENTION

A well-known type of pie crust composed of graham cracker crumbs, has generally been made by maniuplating the crumbs with the fingers and hands to produce a more or less uniform layer of the crumbs in the pie pan. This is often a time consuming operation, and the purpose of the invention is to provide an implement, capable of easy maniuplation by the hand of the user, to accomplish quickly a well-formed crust.

BRIEF DESCRIPTION OF THE INVENTION

The invention embodies, generally, what may be aptly described as a tamping block, having a flat bottom surface, which is recessed at one end to the depth of a desired thickness of finished bottom crust, and the bottom of this recess merges on a convex curve with an end surface which is inclined on the angle of the side wall or rim of the pie pan. In use, a quantity of graham cracker crumbs of the usual nature, or the like, is placed in the pie pan, and the tamper then placed on the bottom surface of the pan, with its inclined end surface facing the inclined rim. The tamper is then manipulated to push the crumbs toward and up the rim of the pan. In this manner, and with a little skill or practice, the crumbs can be rapidly worked up the rim of the pan, and formed into a layer of crumbs of uniform depth, covering the rim of the pan, and extending a short distance inwardly over an outer rim portion of the pan's bottom. The crumbs can thus be compacted into a layer which is entirely stable. The bottom of the crust is then completed by filling in additional crumbs, and tamping them into a proper thickness, using a flat side of the tamper, with a convex marginal edge conforming generally to the curvature of the pan rim. The crumbs can thus be rapidly formed into a uniform depth over both the rim and bottom of the pan, with perfect merging between the crumbs placed over the pan rim and over a narrow outer margin of the pan bottom, and the crumbs later added to complete the bottom crust.

DESCRIPTION OF THE DRAWINGS

In the drawings, showing a present preferred embodiment of the invention.

DESCRIPTION OF A PREFERRED EMBODIMENT

Figure 1:
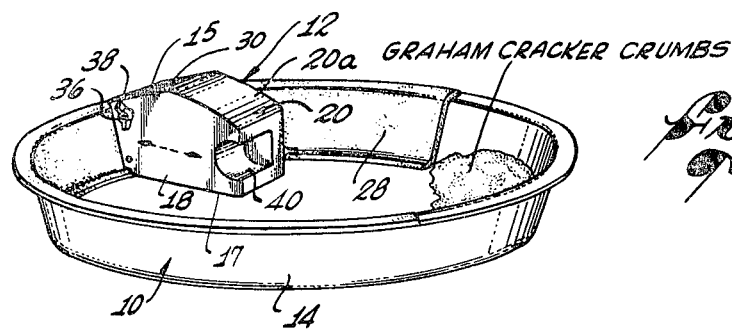
FIG. 1, is a perspective view showing the implement of the invention in use in forming a layer of crumbs on the rim of a pie pan.

In the drawings, a typical pie pan is represented at 10, and the tamper implement of the invention at 12. The side wall or rim of the pan is designated at 14.

The tamper implement comprises a wooden block, and may be a single piece of properly contoured wood, though as here shown, its inclined front end portion 15 is pivoted to the remainder of the block at 16, for adjustment of its incline to accommodate pans of different rim slopes. The invention will be described first as though all essential parts were integrated into a single block, and the angular adjustment of the end portion 15 will be further described later, as a desirable but not completely essential basic feature.

The tamper implement 12 thus comprises a relatively narrow block, with a flat bottom surface 17, flat parallel side surfaces 18 and 19, and a top surface 20, including a top arcuate surface segment 20a. The top 20 is completed by a plane slanting surface 20b connecting arcuate surface section 20a with the inclined front end 15. This inclined front end 15 is of a length equal to the width of the pie pan rim 14.

The bottom of the block, at a point a little short of the inclined front end 15, is notched or recessed, preferably on a convex arc, as at 22, to the depth of the desired bottom layer of crumbs; and the lower end of the inclined front end 15 merges on a somewhat larger arc, as at 24, with the upper end of the arc 22. These converging arcs, or arcuate surfaces, define a recess 26 into the bottom of the front end of the block to a vertical dimension equal to the thickness of the desired bottom crust. The lower end of the arc 24 faces downwardly and functions to tamp or form a marginal layer 27 of crumbs around the periphery of the pan bottom to proper thickness, while the inclined front end 15 tamps and forms a layer 28 of crumbs over or against the pan rim 14.

The implement of the invention may be used without the pivot mounting of the inclined or angular mounting of the front end piece 15. However, a further optional feature is to make the front end piece 15 as a separate part, normally received, with a close fit, in a recess 30 in the front end of the block. This recess 30 is defined by a substantially vertical side wall 31, and two relatively thin side walls 32, which just nicely receive the entirety of the part 15 between them when part 15 is pivoted on pivot pin 16 to its rearmost or retracted position, as shown in FIGS. 1, 2, 3, 5 in full lines, and 6, an outwardly swing position being indicated in phantom lines being shown in FIG. 5. The piece 15 has an arcuate slot 35, concentric with pivot 16, which receives a screw 36 passing also through the two side walls 32, with a recessed head 37 on one end and a wing nut 38 is used to clamp the piece 15 between the thin and slightly flexible side walls 32 in any angular position of adjustment.

Figure 2:
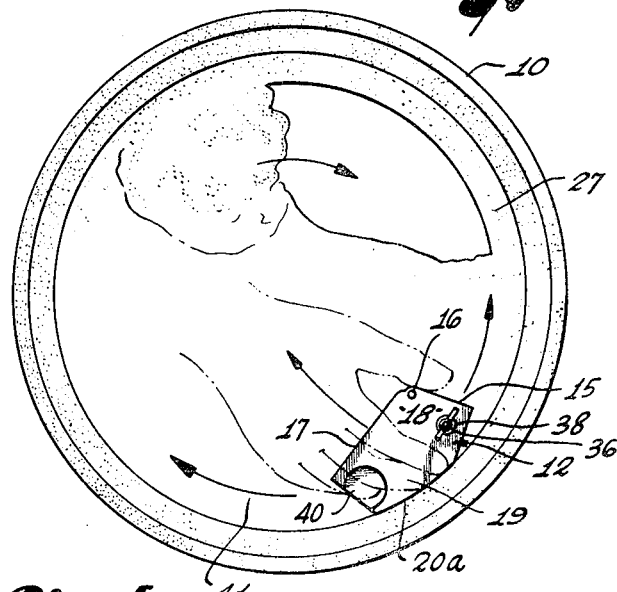
FIG. 2, is a plan view showing the use of the implement in forming the bottom crust and merging it with the portion of crust already laid on the rim of the pan.
Figure 3:
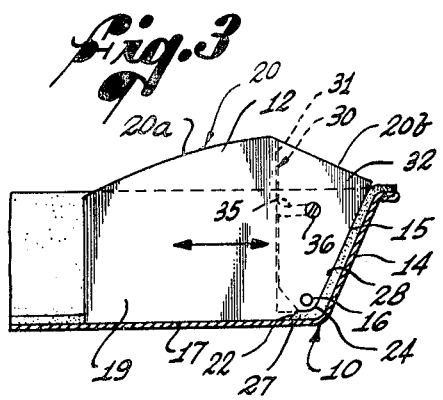
FIG. 3, is a side elevational view of the implement showing it in use in the pan, carrying out the operation represented in FIG. 1.

As a further preferred feature, a finger hole 40 is preferably sunk in one side of the block, for convenient holding by the hand of the user as seen in FIG. 2.

Use of the implement in carrying out the purpose of the invention is as follows:

A quantity of graham cracker crumbs, or the like, is first placed in the bottom of the pie pan 10, just enough being deposited at the start to enable the formation of a portion of the crust to be laid onto the rim of the pan. The implement 12 is then placed with its bottom engaging the bottom of the pan, and the implement is oriented radially of the pan with its slanting forward end portion 15 facing toward the pan rim. The implement is then oscillated forwardly and rearwardly, with its front end picking up and shoving crumbs toward the rim. These crumbs are thus shoved and built up the side wall or rim of the pan, and by oscillating the implement radially, as indicated by the arrow, as well as laterally, a portion of a crust can easily be laid onto the rim 14, in a uniform layer from the pan bottom to the top of the rim. This can be extended circularly around the rim, by adding crumbs from time to time, and continuing with the radial oscillation, as well as lateral movement, as required. A wall of crumbs 28 is thus formed adjacent the rim of pan and this will extend a short marginal distance over an outer region of the pan bottom, as designated at 27, in FIG. 3.

Figure 4:
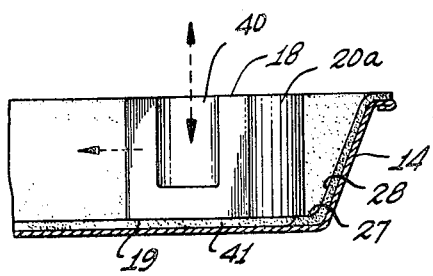
FIG. 4, is a side elevational view showing the implement in use in carrying out the operation represented in FIG. 2.
Figure 6:
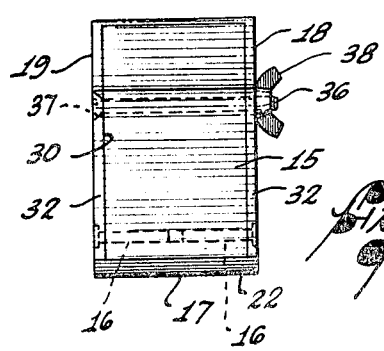
FIG. 6, is a front elevational view of the implement.
Figure 5:
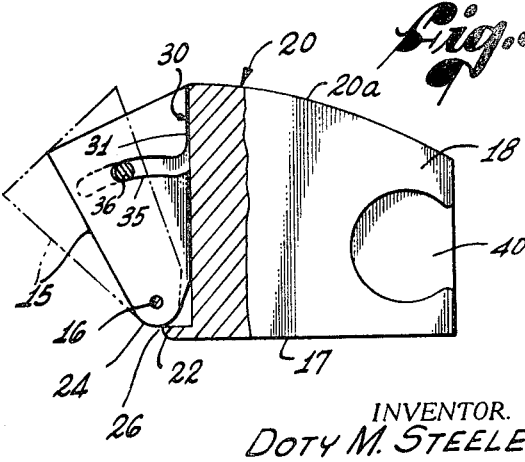
FIG. 5, is a side elevational view of the implement partially broken away, and illustrating, in phantom lines, an alternative position of adjustment of the front end piece.

It will be seen that it is the recessing of the front end portion of the implement, at 26, that forms this marginal portion of crumbs at 28. The side wall of the crust 28 having been suitably formed, additional crumbs are placed in the pan to cover the pan bottom, and the implement 12 is then turned on its side, as in FIGS. 2 and 4, with its arcuate surface 20a confronting the crumb wall 28.

It is then simply used as a tamp to flatten the added crumbs into a bottom layer 41 and to merge the bottom layer with the outer marginal portion 27. By working the tamp circularly around the pie pan, radially back and forth, and in other ways as will be evident, the bottom layer 41 can be nicely formed by means of gently vertical tapping or tamping movements. A good merger of the bottom portion 28 with the portion 27 is readily accomplished and the entire crust thus constructed. With a little experience, this operation can be carried out accurately and rapidly and a very good and uniform crust thus prepared.

I claim:

1. An implement for the purpose described, comprising:
    a block having a plane bottom surface; and an inclined front end on said block formed at an obtuse angle to said bottom surface, to match the inclined rim of a pie pan, the junction of said plane bottom surface with the lower portion of said inclined front end comprising a recess at the front end of said bottom surface, forming a surface extending upwardly from said plane bottom surface, and a surface extending rearwardly from the bottom end of the inclined surface of said front end to meet the upper end of said upwardly extending surface to form a downwardly facing shoulder spaced vertically above said plane bottom surface of the implement.

2. The subject matter of claim 1, wherein said implement has a plane side face, and an arcuate face at right angles thereto.

3. The subject matter of claim 1, wherein said inclined front end comprises a separate part recessed into the front of the block, and pivotally mounted to the block near the bottom thereof for adjustment of its incline relative to its plane bottom surface.

* * * * *